United States Patent
Kahn

(10) Patent No.: US 11,399,343 B2
(45) Date of Patent: Jul. 26, 2022

(54) DELAYED POWER SAVING MODE FOR CUSTOMER-PREMISE EQUIPMENT OR CUSTOMER-PROVIDED EQUIPMENT (CPE) BROADBAND DEVICES

(71) Applicant: ARRIS Enterprises LLC, Suwanee, GA (US)

(72) Inventor: Michael R. Kahn, Cherry Hill, NJ (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/161,290

(22) Filed: Jan. 28, 2021

(65) Prior Publication Data

US 2021/0250862 A1 Aug. 12, 2021

Related U.S. Application Data

(60) Provisional application No. 62/971,283, filed on Feb. 7, 2020.

(51) Int. Cl.
*H04W 52/02* (2009.01)
(52) U.S. Cl.
CPC ... *H04W 52/0225* (2013.01); *H04W 52/0277* (2013.01)

(58) Field of Classification Search
CPC ......... H04W 52/0225; H04W 52/0277; H04W 52/02; H04W 52/0209; H04W 52/0229; H04W 52/0261
See application file for complete search history.

(56) References Cited

U.S. PATENT DOCUMENTS

| | | | | |
|---|---|---|---|---|
| 5,598,567 A | * | 1/1997 | Ninomiya | G06F 1/305 323/318 |
| 2004/0041697 A1 | * | 3/2004 | Nattkemper | G06F 1/305 370/464 |

* cited by examiner

*Primary Examiner* — Philip Sobutka
(74) *Attorney, Agent, or Firm* — Panitch Schwarze Belisario & Nadel LLP

(57) ABSTRACT

A method and system are disclosed for implementing a power saving mode for broadband devices. The method includes setting a delay to enter power saving mode on a broadband device, the delay to enter power saving mode configured to delay transition of the broadband device into a power saving mode for a set period of time when power is lost to the broadband device; and setting a delay to exit power saving mode on the broadband device, the delay to exit setting configured to delay transition of broadband device to a normal power mode for a set period of time after power is restored to the broadband device.

20 Claims, 6 Drawing Sheets

DELAYED POWER SAVING MODE FOR CUSTOMER-PREMISE EQUIPMENT OR CUSTOMER-PROVIDED EQUIPMENT (CPE) BROADBAND DEVICES

TECHNICAL FIELD

The present disclosure generally relates generally to a method and system for an intelligent power saving mode for customer-premise equipment or customer-provided equipment (CPE) broadband devices, and more particularly to a method and system for implementing a power saving mode for broadband devices by setting a delay to enter power saving mode and a delay to exit power saving mode on the broadband device.

BACKGROUND

Cable service providers, which are also referred to as Multiple System Operators ("MSO"), or any communication or content distribution business that operates through a cable network, renders its services to its subscribers. The services can include, but are not limited to, different subscription plans for broadband Internet access and telephony. In order to consume these services, subscribers connect to a private network owned (or co-owned or rented) by the broadband cable operator which is implemented according to the Data Over Cable Service Interface Specification (DOCSIS) standard.

Subscribers connect their computers, routers, voice-over-IP telephones and other devices to this network through the network terminals, for example, cable modems (CM) or network gateways. The network terminals, for example, cable modems (CM) or network gateways include hardware which runs software that provides the low-level control for the device's specific hardware, which is known as firmware, which can be updated by pushing a new firmware version (or image) from time to time to the network gateway, for example, the cable modem (CM) or gateway. In some situations, it may be desirable to roll-back the firmware version or image to the previous version of the firmware or image.

Broadband devices such as integrated modem/router/multimedia terminal adapter (MTA) devices enable a "triple play" of voice, data, and video services. Thus, these devices provide critical functionality, such as the ability to use 911 and other emergency services. If power is lost at the premises, the broadband device will lose power, taking out voice, data, and video. While a user can install his/her broadband device on an uninterruptable power supply (UPS), that is not the most efficient for maximizing battery power in the event of a lengthy power outage.

To address this, many broadband devices have a power savings mode (PSM), that enables, for example, the voice functionality, while shutting down other power consuming elements such as Wi-Fi, and Ethernet ports, which can prolong the UPS battery life, enabling voice functionality, while shutting down other parts of the broadband device.

However, power outages in residential areas can be brief (for example, less than one minute), and when the broadband device enters PSM mode upon loss of power, internet sessions are often interrupted. In the case of a "power flapping" scenario, this can actually make the broadband device less usable than if it is installed on a conventional UPS.

SUMMARY

In accordance with exemplary embodiments, it would be desirable to have a system and method having an intelligent power saving mode for customer-premise equipment or customer-provided equipment (CPE) broadband devices, which addresses the disadvantages of UPS and PSM by implementation of an intelligent PSM, using a combination of user-defined power policies, and environmental information from external sources.

In accordance with an aspect, a method for implementing a power saving mode for broadband devices, the method comprising: setting a delay to enter power saving mode on a broadband device, the delay to enter power saving mode configured to delay transition of the broadband device into a power saving mode for a set period of time when power is lost to the broadband device; and setting a delay to exit power saving mode on the broadband device, the delay to exit setting configured to delay transition of broadband device to a normal power mode for a set period of time after power is restored to the broadband device.

In accordance with an another aspect, a broadband device, the broadband device comprising: a power saving mode, the power saving mode configured to operate the broadband device in a reduced power mode when power is lost to the broadband device; and a processor configured to: delay transition of the broadband device into the power saving mode for a set period of time when the power is lost to the broadband device; and delay transition of broadband device to a normal power mode for a set period of time after power is restored to the broadband device.

DETAILED DESCRIPTION

Figure 1:
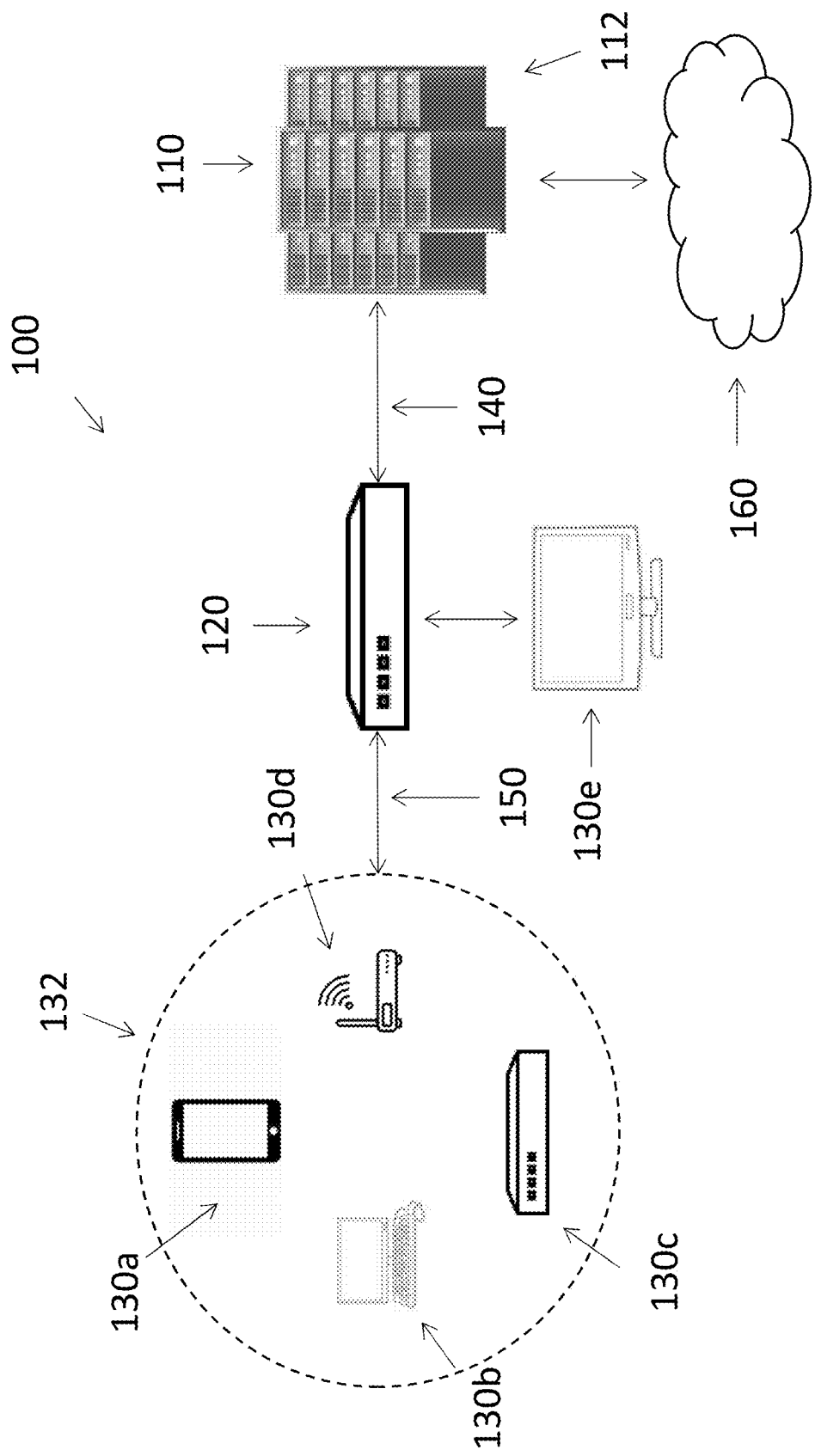
FIG. 1 is an illustration of an exemplary network environment for a system and method for intelligent power saving mode for customer-premise equipment or customer-provided equipment (CPE) broadband devices.

System for Intelligent Power Saving Mode for Customer-Premise Equipment or Customer-Provided Equipment (CPE) Broadband Devices FIG. 1 is a block diagram illustrating an example network environment 100 operable for intelligent power saving mode for customer-premise equipment or customer-provided equipment (CPE) broadband devices 120. In accordance with an exemplary embodiment, the customer-premise equipment or customer-provided equipment (CPE) broadband device 120 can include, for example, a network gateway in the form of a modem/router/MTA device configured to provide voice, data, and video services. In embodiments, the CPE broadband device 120 can provide, for example, video and/or data services to a plurality of devices 130a, 130b, 130c, 130d, 130e. The CPE broadband device 120 may communicate with the plurality of devices 130a, 130b, 130c, 130d over a local network 132 (for example, a local area network (LAN), a wireless local area network (WLAN), a personal area network (PAN), etc.) and/or wired, for example, a television 130e connected to a modem, and may communicate with an upstream wide area network (WAN) 160 through a connection 150 to a cable provider 110. The cable provider 110 can provide high-bandwidth data transfer, for example, cable television and broadband internet access via, for example, coaxial cables 140. The cable provider 110 can include one or more servers 112 configured to deliver services, for example, cable television and/or broadband internet and infrastructure supporting such services including management of image software and/or firmware.

In accordance with an exemplary embodiment, the CPE broadband device 120 and the plurality of devices 130a, 130b, 130c, 130d, 130e can be configured to connect via a wireless network, for example, wireless network utilizing an IEEE 802.11 specification, including a set-top box (STB), a smart phone, a smart TV, a computer, a mobile device, a tablet, a router, a home security system, or any other device operable to communicate wirelessly with the CPE broadband device 120. The CPE broadband device 120 may provide access to an external network, such as the Internet, for any devices connected thereto via the area network 132. The area network 132 may be, for instance a local area. In accordance with an exemplary embodiment, the CPE broadband device 120 may be a gateway device, an access point, a modem, a wireless router including an embedded modem, a wireless network extender or any other device operable to deliver, for example, data and/or video services from the provider 110 and/or a wide area network (WAN) 160 to one or more of the plurality of devices 130a, 130b, 130c, 130d, 130e.

In accordance with an exemplary embodiment, the CPE broadband device 120 may communicate with the provider 110 over a wired or a wireless connection. A wireless connection between the provider 110 and the CPE broadband device 120 may be established through a protected setup sequence (for example, Wi-Fi protected setup (WPS)). The protected setup sequence may include the steps of scanning multiple wireless channels for an available access point, exchanging one or more messages between a station and access point, exchanging key messages (for example, pre-shared key (PSK)) between the station and access point, and installing a key (for example, PSK) at the station.

Figure 2:
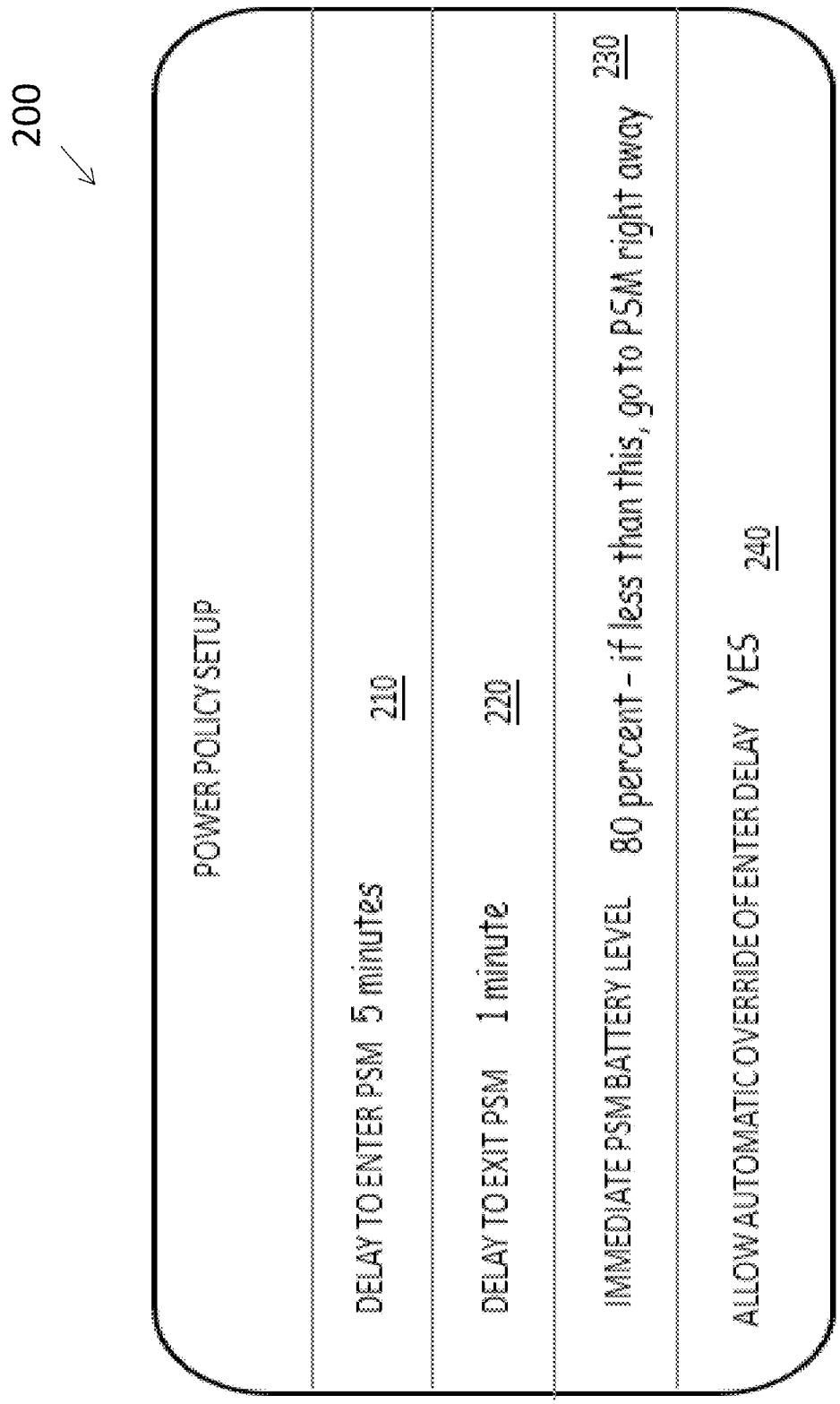
FIG. 2 is an illustration of a graphical user interface having a power policy setup for a CPE broadband device in accordance with an exemplary embodiment.

Process for Intelligent Power Saving Mode for Customer-Premise Equipment or Customer-Provided Equipment (CPE) Broadband Devices FIG. 2 shows an example of a power policy setup on a graphical user interface for a CPE broadband device 120 in accordance with an exemplary embodiment. In accordance with an exemplary embodiment, the graphical user interface (GUI) can be a user interface, for example, implemented in HTML and accessed by the user using a client device (e.g. laptop 130a, 130b) connected to the broadband device 120 on the LAN side. As shown in FIG. 2, the power policy setup can include the following settings: Delay to Enter PSM 210 (delay to enter power saving mode (PSM)), a Delay to Exit PSM 220 (delay to exit power saving mode (PSM)), an Immediate PSM Battery Level 230 (immediate power saving mode (PSM) battery level), and an Allow Automatic Override of Enter Delay 240 allow automatic override of enter delay).

In the accordance with an exemplary embodiment, the Delay to Enter PSM 210 setting determines how long after power is lost, when does the CPE broadband device 120 transition to power savings mode. For example, the Delay to Enter PSM 210 setting can be set for 1 minute to 15 minutes. As shown in FIG. 2, for example, the Delay to Enter PSM 210 setting has been set to 5 minutes. Accordingly, as shown in FIG. 2, if power is lost for more than 5 minutes, the CPE broadband device 120 enters the power savings mode after 5 minutes.

In accordance with an exemplary embodiment, the Delay to Exit PSM 220 setting determines how long after power is restored does the device transition to normal power mode. The Delay to Exit PSM 220 setting can be set, for example, to between 30 seconds and 5 minutes. In the example, the Delay to Exit PSM 220 setting is 1 minute, which means that if power is restored and stays on for more than 1 minute, the CPE broadband device 120 exits the power savings mode and returns to the normal power mode. In accordance with an exemplary embodiment, the Delay to Enter PSM 210 and the Delay to Exit PSM 220 settings can help isolate cases of "power flapping" where the power is going on and off frequently during a disturbance.

In accordance with an exemplary embodiment, the Immediate PSM Battery Level option 230 allows setting of a battery charge level under which, PSM mode is entered immediately. For example, if the battery level is between 50 percent or less and 90 percent or less, and the power is lost, the CPE broadband device 120 enters the power saving mode immediately. In the example, if the battery level is 80 percent or less, and the power is lost, the CPE broadband device 120 enters power savings mode immediately, and does not wait for the Delay to Enter PSM 210 setting value.

In accordance with an exemplary embodiment, the Allow Automatic Override of Enter Delay 240 option allows the use of external information to override the preset times. The external information can come from a variety of sources, including, but not limited to, weather service information, social media information, local alert services, and/or crowd-sourced information. The Allow Automatic Override of Enter Delay 240 (allow automatic override of enter delay option) is "Yes" or "No".

In accordance with an exemplary embodiment, other options can include if power is lost, after a period of time, for example, 1 minute to 5 minutes, Bluetooth can be shut off. In addition, after a predetermined period of time, for example, 5 minutes to 15 minutes, Wi-Fi can be shut off. In accordance with an embodiment, wired connections can also be adjusted individually, for example, options can include cutting or shutting off a port altogether, port by port, for example, printer on port 1 can be shut off, and kidney dialysis on port 3 can be kept on or going.

Figure 3:
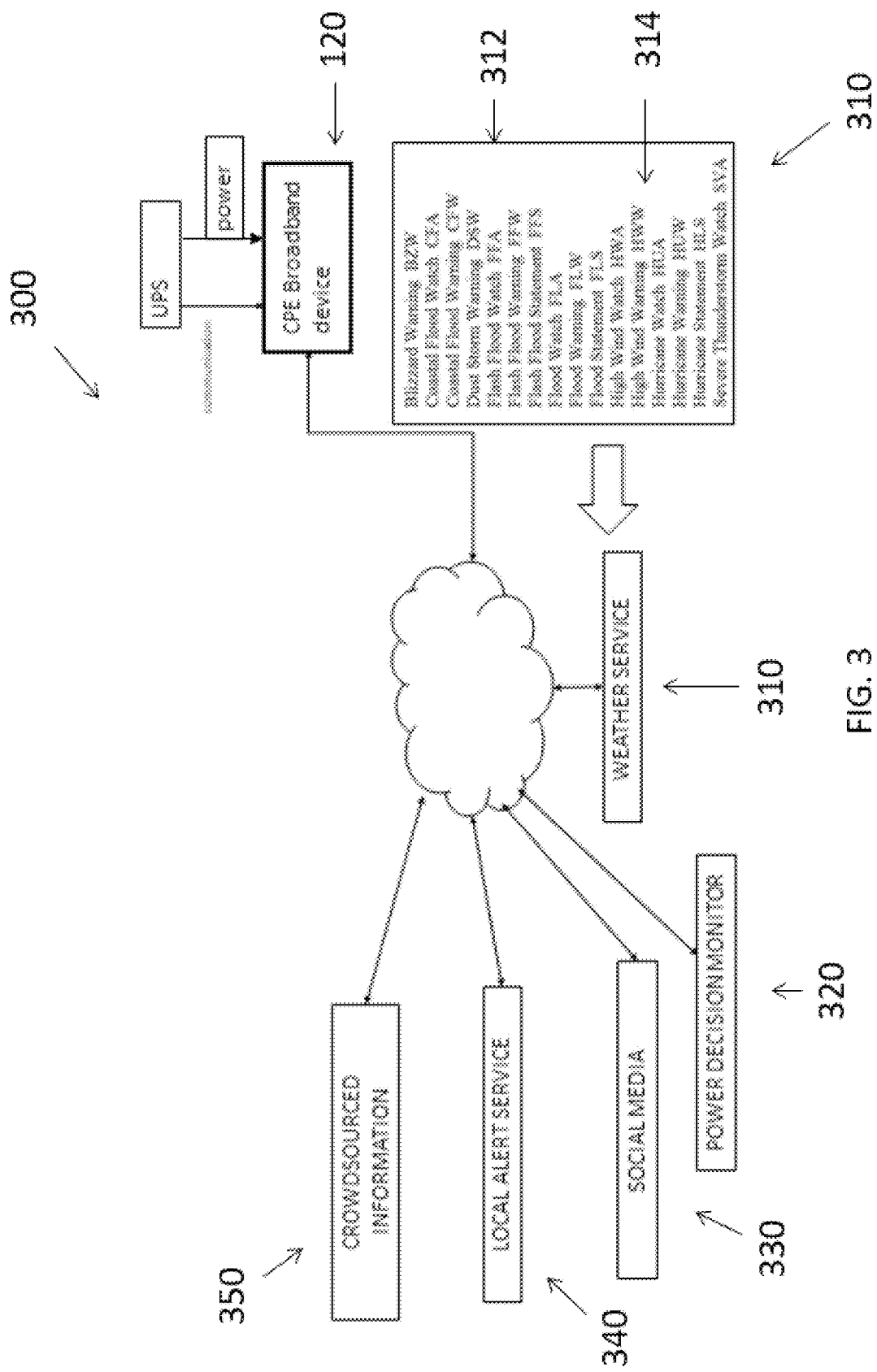
FIG. 3 is a block diagram of the CPE broadband device and external sources that can be used in making a decision to enter power savings mode in accordance with an exemplary embodiment.

FIG. 3 is a block diagram 300 of the CPE broadband device 120 and the external sources used in making a decision to enter power savings mode. For example, as shown in FIG. 3, the National Weather Service 310 has codes for various weather events 312, some of which are shown in FIG. 3. Certain events may be associated with an elevated probability of a power loss for an extended time. As an example, the High Wind Warning code (HWW) 314 may be associated with widespread power loss for an extended period. Thus, if power is lost at a premise, and the CPE broadband device 120 accesses (via an API), the current weather service code 312, and that code 312 is associated with extended power loss, then the CPE broadband device 120 can immediately enter a power savings mode to maximize conservation of battery life.

In accordance with an exemplary embodiment, a power decision monitor 320 can be used to display, for example, one or more the external sources used in making the decision to enter the power savings mode. In addition, the power decision monitor 320 can show the corresponding power associated with a portion or portions of a city, county, and/or state including, for example, the time in which a portion of the city, county, and/or state has been without power and any forecast for resuming and/or further power losses.

In addition, other sources of external information can be used, for example, social media 330. For example, public pages/feeds can be scraped to determine if widespread power outages have occurred, which can in turn influence the power policy decision. In addition, a local alert service 340 via e-mail or social media by a municipality may be used. Additionally, crowdsourced information 350 (for example, self-reported outage sites) may be used to determine if power outages are widespread. In accordance with an exemplary embodiment, widespread outages are typically associated with longer outage times, since more areas are in need of repair. In such cases, for example, the CPE broadband device 120 can immediately enter a power savings mode.

Conversely, if power is mostly operational within the area, the power may be restored quickly, and in such cases, the CPE broadband device 120 can defer entering power saving mode, as specified in the options of FIG. 2. In this way, for short duration power outages, CPE broadband sessions are preserved, minimizing disruptions at the customer premises, while disruptions that are expected to be longer quickly enter power savings mode, thereby extending battery life and extending the operational time of critical systems such as MTA voice.

Figure 4:
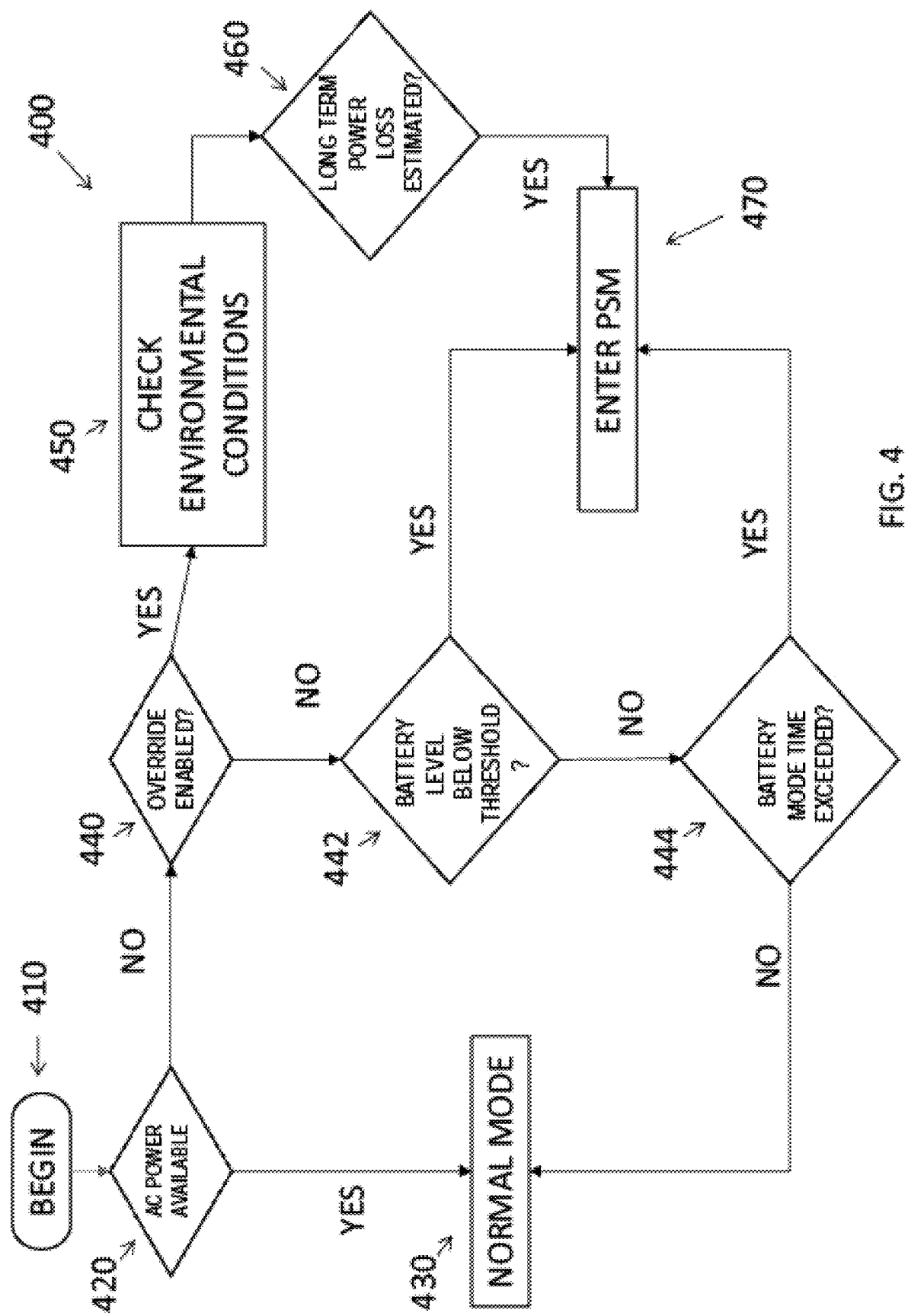
FIG. 4 is a flowchart illustrating an exemplary embodiment of an intelligent power saving mode for CPE broadband devices when power is lost.

FIG. 4 is a flowchart 400 illustrating an exemplary embodiment of an intelligent power saving mode for CPE broadband devices when power is lost. As shown in FIG. 4, the process starts in step 410. In step 420, if AC power (alternating current (AC)), for example, electricity from a power and electric company, converted from solar power or an alternative energy generating system configured to supply electricity, for example, to a homeowner or business. If AC power is available, the CPE broadband device 120 enters normal mode (step 430). In normal mode 430, all interfaces (Wi-Fi, Ethernet) are enabled. If AC power is not available, the process continues to step 440, then a check is made to see if the override is enabled (last option in FIG. 2). If the override is enabled in step 440, the process continues to step 450, where the environmental conditions are checked, such as weather service 310, social media 330, and/or crowdsourced information 350 as shown in FIG. 3. If it is estimated that a long-term power loss may be in effect in step 460, then the CPE broadband devices 120 enters power saving mode (PSM) (step 470).

In accordance with an exemplary embodiment, if in step 440, the override is not enabled, the process continues to steps 442, 444, where a determination is made if the battery level is below a threshold, or the device has been running on battery for a time that exceeds a predetermined threshold, then the device enters power saving mode (step 470).

Thus, in accordance with an exemplary embodiment, the user gets the benefit of an uninterrupted power supply (UPS) combined with the intelligent power policy to allow the conservation of battery power when needed, while minimizing disruptions due to a potentially brief power loss, thus improving overall reliability and customer experience of the CPE broadband device 120.

Figure 5:
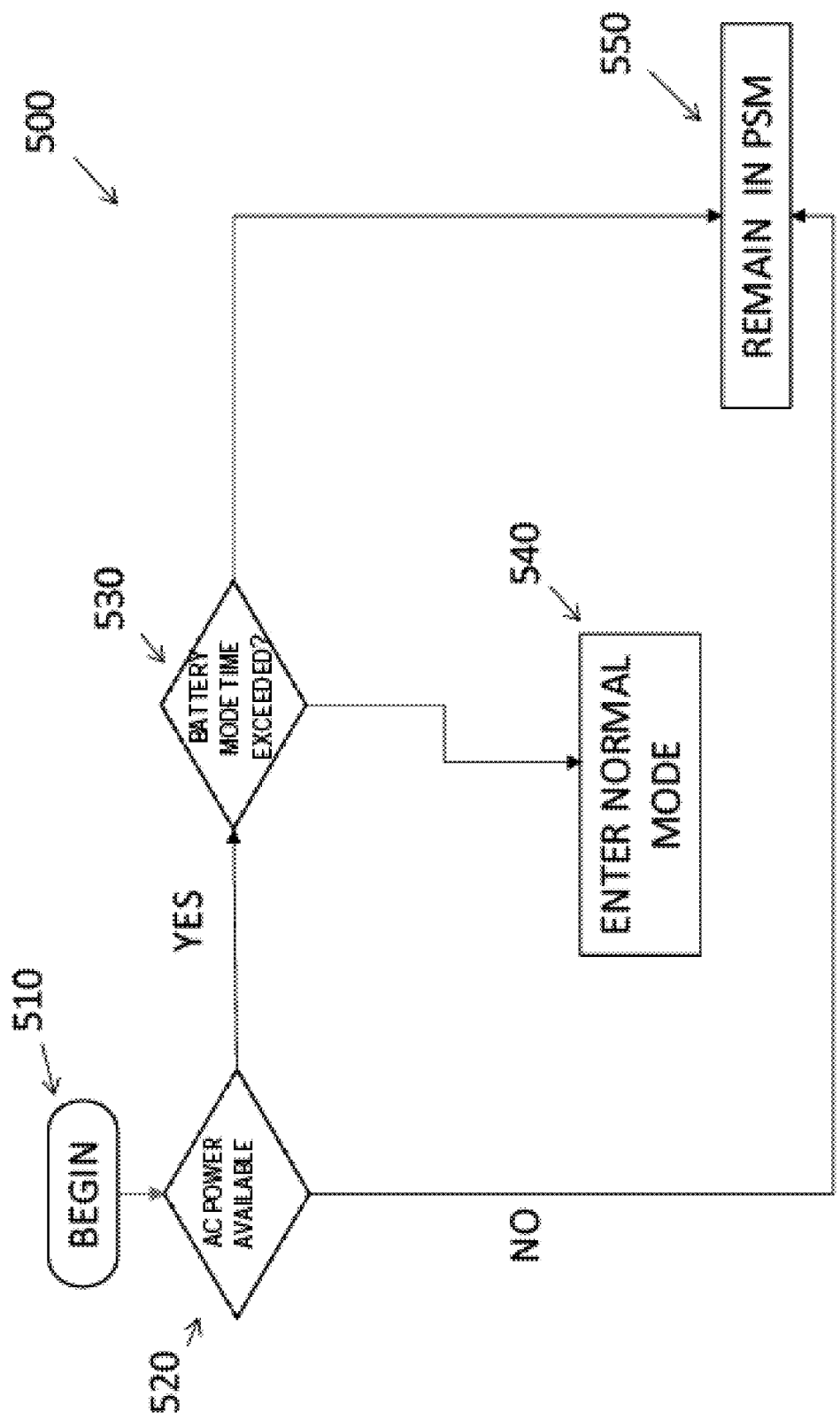
FIG. 5 is a flowchart illustrating an exemplary embodiment of an intelligent power saving mode for CPE broadband devices when power is being regained.

FIG. 5 is a flowchart 500 illustrating an exemplary embodiment of an intelligent power saving mode for CPE broadband devices 120 when power is being regained. As shown in FIG. 5, in step 510, the process begins. In step 520, a determination is made if AC power is available to the CPE broadband device 120. If in step 520, if AC power is not available to the CPE broadband device 120, the process continues to step 550 where the CPE broadband device 120 remains in the power savings mode (PSM).

If in step 520, AC power is available to the CPE broadband device 120, the process continues to step 530 where a determination is made if the battery mode time has been exceeded (220). If the battery mode time has been exceeded in step 530, the CPE broadband device 120 remains in the power saving mode (PSM). If in step 530, the battery mode time (220) has not been exceeded, the process continues to step 540, where the CPE broadband device 120 enters the normal mode.

Computer System Architecture

Figure 6:
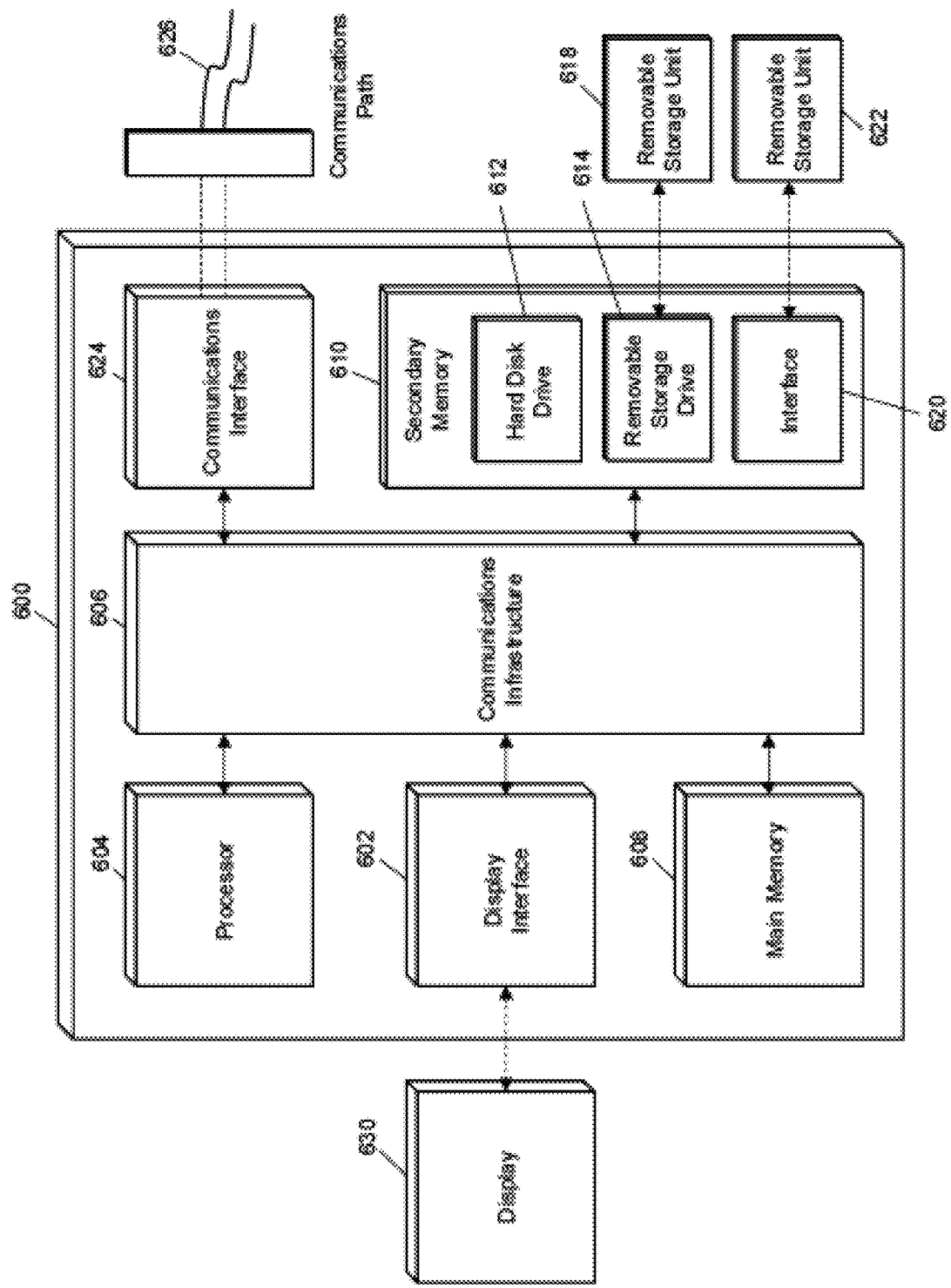
FIG. 6 is an exemplary hardware architecture for an embodiment of a communication device.

FIG. 6 illustrates a representative computer system 600 in which embodiments of the present disclosure, or portions thereof, may be implemented as computer-readable code executed on a processor of a computer. For example, the one or more servers 112, the CPE broadband device 120, and the plurality of devices 130a, 130b, 130c, 130d, 130e of FIG. 1 may be implemented in whole or in part by a computer system 600 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the present disclosure.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this representative computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 1-5, as discussed herein. Accordingly, such computer programs may represent controllers of the computer system 600. Where the present disclosure is implemented using software executed on hardware, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software executed on hardware, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for reducing service impact to users during image and/or firmware changes. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for implementing a power saving mode for broadband devices, the method comprising:
    setting a delay to enter power saving mode on a broadband device, the delay to enter power saving mode configured to delay transition of the broadband device into a power saving mode for a set period of time when power is lost to the broadband device;
    setting a delay to exit power saving mode on the broadband device, the delay to exit setting configured to delay transition of the broadband device to a normal power mode for a set period of time after power is restored to the broadband device; and
    setting an immediate power saving mode battery level option on the broadband device, the immediate power saving mode battery level option configured to transition the broadband device immediately into the power saving mode when a battery level of the broadband device is below a predetermined percentage when the power is lost to the broadband device.

2. The method according to claim 1, further comprising:
    setting an allow automatic override of enter delay option on the broadband device, the allow automatic override of enter delay option configured to allow external information to override a preset time for the delay to enter power saving mode on the broadband device.

3. The method according to claim 2, wherein the external information is received from one or more of the following:
    weather service information, social media information, local alert services, and/or crowdsourced information.

4. The method according to claim 2, further comprising:
    setting the delay to enter power setting mode, the delay to exit power setting mode, the immediate power saving mode battery level and/or the allow automatic override of enter delay setting on a graphical user interface (GUI) and accessed by a user via a client device connected to the broadband device.

5. The method according to claim 1, further comprising:
    shutting off one or more of the following functions of the broadband device after a preset period of time when the power is lost to the broadband device:
    Wi-Fi, Bluetooth, wired connections, and/or port by port.

6. The method according to claim 1, comprising:
    maintaining a voice functionality of the broadband device; and
    shutting down power consuming elements including one or more of Wi-Fi and/or Ethernet.

7. The method according to claim 1, comprising:
    operating the broadband device is a normal operating mode when AC current is available to the broadband device.

8. The method according to claim 1, further comprising:
    setting the delay to enter the power saving mode on the broadband device for 1 minute to 15 minutes.

9. The method according to claim 1, further comprising:
    setting the delay to exit the power saving mode on the broadband device to 30 seconds to 5 minutes.

10. A broadband device, the broadband device comprising:
    a power saving mode, the power saving mode configured to operate the broadband device in a reduced power mode when power is lost to the broadband device; and
    a processor configured to:
        delay transition of the broadband device into the power saving mode for a set period of time when the power is lost to the broadband device;
        delay transition of the broadband device to a normal power mode for a set period of time after power is restored to the broadband device; and
        transition the broadband device immediately into the power saving mode when a battery level of the broadband device is below a predetermined percentage when the power is lost to the broadband device.

11. The broadband device according to claim 10, wherein the processor is configured to:
    allow external information to override a preset time for the delay to enter power saving mode on the broadband device.

12. The broadband device according to claim 11, wherein the external information is received from one or more of the following:
    weather service information, social media information, local alert services, and/or crowdsourced information.

13. The broadband device according to claim 10, further comprising:
    a graphical user interface (GUI) configured to set the period of time for the delayed transition of the broadband device into the power saving mode when the power is lost to the broadband device, and the period of time for the delayed transition of the broadband device to the normal power mode after the power is restored to the broadband device.

14. The broadband device according to claim 13, wherein the graphical user interface (GUI) is accessed by a user via a client device connected to the broadband device.

15. The broadband device according to claim 10, wherein the processor is configured to:
    shut off one or more of the following functions of the broadband device after a preset period of time when the power is lost to the broadband device:
    Wi-Fi, Bluetooth, wired connections, and/or port by port.

16. The broadband device according to claim 10, wherein the voice functionality of the broadband device is maintained in the power saving mode.

17. The broadband device according to claim 16, wherein the power consuming elements including one or more of Wi-Fi and/or Ethernet are shut down during the power saving mode.

18. The broadband device according to claim 10, wherein the broadband device is in a normal operating mode when AC current is available to the broadband device.

19. A broadband device, the broadband device comprising:
    a power saving mode, the power saving mode configured to operate the broadband device in a reduced power mode when power is lost to the broadband device;
    a processor configured to:
        delay transition of the broadband device into the power saving mode for a set period of time when the power is lost to the broadband device; and delay transition of the broadband device to a normal power mode for a set period of time after power is restored to the broadband device; and a graphical user interface (GUI) configured to set the period of time for the delayed transition of the broadband device into the power saving mode when the power is lost to the broadband device, and the period of time for the delayed transition of the broadband device to the normal power mode after the power is restored to the broadband device.

20. The broadband device according to claim 19, wherein the graphical user interface (GUI) is accessed by a user via a client device connected to the broadband device.

* * * * *